United States Patent [19]

Stahl et al.

[11] Patent Number: 4,752,088
[45] Date of Patent: Jun. 21, 1988

[54] TOOL ADAPTER ASSEMBLY AND EXTENDED COMPRESSION/TENSION TAP DRIVER

[75] Inventors: Gunter R. Stahl, Canoga Park; Michael E. Campbell, Simi Valley; Lloyd Bernath, Granda Hills, all of Calif.

[73] Assignee: Carboloy Inc., Warren, Mich.

[21] Appl. No.: 362,751

[22] Filed: Mar. 29, 1982

[51] Int. Cl.⁴ ............................................. F16L 39/00
[52] U.S. Cl. ..................................... 285/169; 285/316
[58] Field of Search ............... 285/316, 169, 363, 104; 279/20, 22; 408/56, 57, 59

[56] References Cited

U.S. PATENT DOCUMENTS

| | | | |
|---|---|---|---|
| 2,690,918 | 10/1954 | Holte | 285/316 X |
| 3,364,800 | 1/1968 | Benjamin et al. | 408/59 X |
| 3,460,410 | 8/1969 | Briles | 408/57 |
| 3,521,895 | 7/1970 | Smith | 279/22 |
| 4,080,090 | 3/1978 | Kern | 279/20 X |

Primary Examiner—Randolph A. Reese
Assistant Examiner—Anthony Knight
Attorney, Agent, or Firm—Hedman, Gibson, Costigan & Hoare

[57] ABSTRACT

A tool adapter assembly is provided for securing a machining tool, such as a tap, to a tool driving device. The tool adapter assembly is provided with one or more conduits extending from the portion which is connected to the tool driving device to the end of the tool adapter assembly adjacent to the tool such that a lubricant or coolant may be delivered through the conduits to the tool during the machining operation. Also disclosed is an extended tension/compression tap driver of limited diameter which includes a central bore disposed therethrough, such that when the above described tool adapter assembly is secured to the extended tension/compression tap driver, the coolant or lubricant can be supplied from the tap driver through the tool adapter assemby to the tool secured thereto.

7 Claims, 2 Drawing Sheets

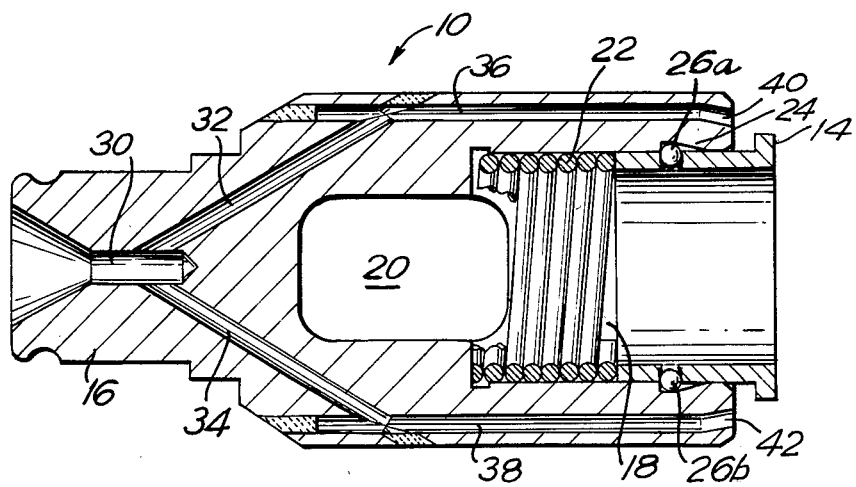
FIG. IA
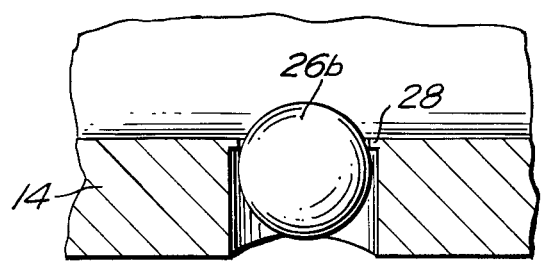
FIG. IB

TOOL ADAPTER ASSEMBLY AND EXTENDED COMPRESSION/TENSION TAP DRIVER

BACKGROUND OF THE INVENTION

The present invention is directed to the fields of tap driving, drilling, and the like, and particularly to machining processes which require the use of coolants or lubricants on the tool.

The use of cooling and lubrcating liquids such as sulfur based oils, synthetics, and the like, in machining operations such as tapping and drilling are well known. The coolant or lubricant must be disposed at the interface of the tool and the metal in order to be effective.

Unfortunately, the prior art techniques for providing the lubricant or coolant at the appropriate locations have been made difficult in many applications due to inaccessibility of the machined surface to the source of the coolant or lubricating fluid. One solution to the problem of inaccessibility in the field of tap driving has been to provide a tap driver having a central bore through which the coolant is passed. The tap which is attached to the tap driver is also provided with an internal bore and output ports through which the coolant may travel and exit. However, taps, as well as other tools, such as drills and the like, are typically not provided with the central bore and output ports as required for the above-described operation. Providing the tool with the requisite bore and output ports is an exceedingly expensive and time consuming operation and further causes a weakening of the tool.

To further complicate matters, the above-described inaccessibility of certain machined surfaces upon which the tools act, many times requires the use of an extended tool driver which must be of limited diameter so that the tool driver can extend through small openings in a particular structure to reach the surface to be machined. This can cause problems where an extended driver, such as an extended "tension/compression" tap driver must be employed, due to the hardware, such as tension and compression springs, seals, and the like, which must be incorporated into the tap driver. The limited diameter allowable on such a tap driver places a severe constraint on the ability of a tap driver to provide such tension and compression functions.

OBJECTS AND SUMMARY OF THE INVENTION

It is therefore an object of the invention to overcome the problems associated with providing a coolant or lubricant to the appropriate portion of a relatively inaccessable location on a surface to be machined.

It is a furtner object to overcome the difficulties associated with providing an extended tension/compression tap driver having a limited diameter.

It is a further object to provide a tool adapter assembly which allows a coolant or lubricant to be provided to the tool/metal interface from a remote location.

It is a further object to provide a tool adapter assembly which allows a coolant or lubricant to be placed at the tool/metal interface without requiring the use of a tool having a fluid conduit therein.

It is a further object to provide a tool adapter assembly which allows a coolant or lubricant to be placed at a desired location and which may be readily secured to a standard tool driver and to a standard tool.

It is a further object to provide an extended tension/compression tap driver which provides a precise amount of tension and compression during a tap driving operation, yet which is of relatively small diameter.

According to a first aspect of the invention, an adapter for use with a machining tool comprises a main portion having a cavity therein adapted to receive and secure the machining tool thereto. A connector portion is attached to the main portion and is adapted to be secured to a device for driving the machining tool. At least one conduit extends through the connector and main portions, the conduit having an inlet at the connector portion and an outlet at the main portion, and adapted to have a fluid applied to the inlet and exit at the outlet to thereby provide the machining tool with the fluid.

Preferably, the conduit is oriented at the outlet so as to direct the fluid directly onto the machining tool. The conduit may comprise a centrally disposed bore extending through the connector portion parallel to the axis of rotation of the adapter. The conduit may further comprise in the main portion of the adapter a first bore intersecting the centrally disposed bore at a first end of the first bore and disposed at an angle with respect to the axis of rotation, and a second bore intersecting a second end of the first bore and extending substantially parallel to the axis of rotation to the end of the main portion. The end of the second bore is angled with respect to the axis of rotation to thereby direct the fluid directly onto the tool.

A specific tool which may be used with the adapter is a tap. The cavity in the adapter may be provided with an internal flange, and the tap may be secured to the main portion by a bushing which abuts, and is concentric with the internal surface of the cavity. The bushing includes a bearing partially captive therein and located in the vicinity of the internal flange. The bushing is adapted to be forced radially outward from the cavity by a spring provided between the cavity and the bushing, whereby when the bushing is moved axially inward, the bearing can recede into the internal flange to allow the tool to be inserted into, or removed from the cavity. When the bushing is forced outwardly under the force of the spring, the bearing is forced radially inward into the cavity to bear upon the tool to thereby secure the tool within the cavity. Preferably, the connector portion is generally cylindrical and is provided on the exterior thereof with a circumferential groove adapted to mate with a quick release type fixture on the device for driving the machine tool.

In accordance with the second aspect of the invention, an apparatus for driving a tap includes a generally cylindrical shaft adapted at one end to be secured to means for rotating the shaft, the shaft having a shaft bore disposed therethrough. A generally cylindrical tap retaining device is mounted substantially concentrically within and adjacent to the other end of the shaft so as to allow axial movement relative to the shaft. The tap retaining device is adapted to secure the tap thereto. A device is provided for transferring rotational movement from the shaft to the tap retaining device. A first abutment is attached to the interior of the tap retaining device and extends radially inward therefrom. A generally cylindrical center stud is secured to the shaft and is disposed substantially concentrically within the shaft and the tap retaining device. The stud has a stud bore disposed therethrough in communication with the shaft bore. A second abutment is attached to the exterior of the center stud and extends radially outward therefrom.

A spring retaining device is disposed on the side of the first and second abutments which is closer to the one end of the shaft. The spring retaining device is adapted to be in abutting relationship with the first and second abuttments. A first compression spring is functionally disposed between the spring retaining device and the shaft, and a second compression spring is functionally disposed between the spring retaining device and the tap retaining device. The above structure provides a tension/compression tap driving device which allows a fluid to be delivered to the tap secured to the tap retaining device by way of the shaft bore and the stud bore.

In accordance with preferred embodiments, the center stud may be threadedly secured to the shaft, whereby the position of the second abutment relative to the shaft may be adjusted by rotating the center stud relative to the shaft. The first compression spring is in abutment with the spring retaining device and the shaft, and the second compression spring is in abutment with the spring retaining device and a retaining ring fixedly secured to the tap retaining device. The spring retaining device is generally cylindrical, is concentrically disposed between the tap retaining device and the center stud, and at least a portion of the spring retaining device is in abutment with the tap retaining device and the center stud. The first compression spring may be concentrically mounted in close fitting relationship about the center stud, and the second compression spring may be concentrically mounted between the first compression spring and the tap retaining device.

Preferably, the tap is secured to the tap retaining device by a fitting integral with the tap retaining device and a tap adapter which is selectively attachable to, and releaseable from the fitting, the tap adapter provided to secure the tap thereto. The tap adapter may comprise at least one conduit therethrough whereby the fluid may be delivered to the tap by way of the shaft bore, the stud bore, and the conduit.

BRIEF DESCRIPTION OF THE DRAWINGS

These and other objects, aspects and embodiments of the invention will be described in more detail with reference to the following drawing figures of which:

FIG. 1A is a cross sectional view of the tool adapter assembly;

FIG. 1B a cross sectional view illustrating a portion of the tool adapter insert bushing employed to secure the tool to the tool adapter.

DETAILED DESCRIPTION OF THE INVENTION

Figure 2:
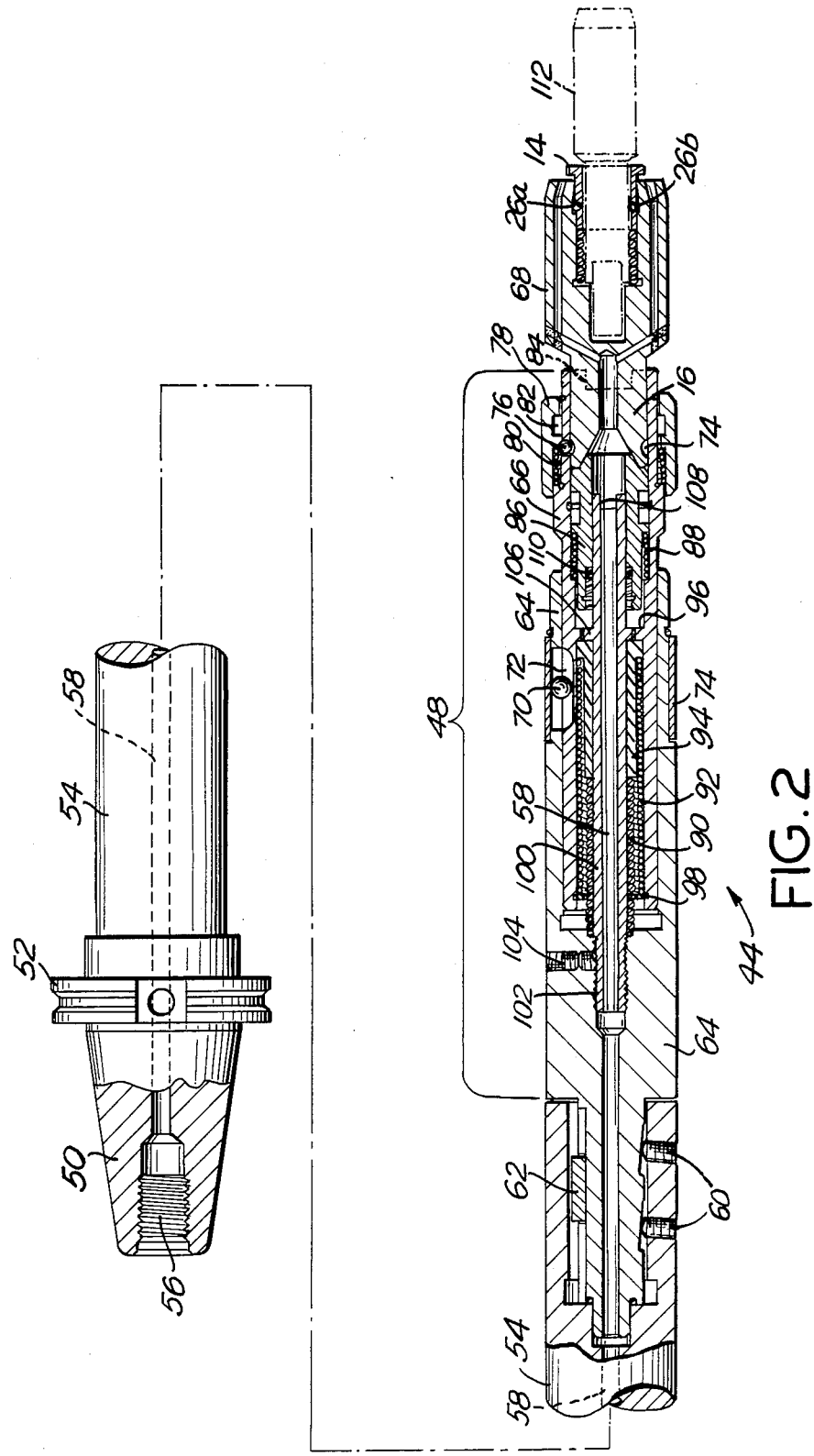
FIG. 2 is a cross sectional view of the adjustable, center coolant fed, ball driven tension/compression tap driver unit having a tap adapter assembly secured thereto.

The tool adapter assembly 10 illustrated in FIG. 1 generally comprises a tool holder portion 12 and tool adapter insert bushing 14. The tool holder portion 12 is provided at one end with a fitting 16 adapted to allow the tool holder 12 to be secured to a tool driver. Centrally disposed within the tool holder 12 at the other end thereof is a cavity 18 into which the appropriate tool is disposed. Also shown is a slot 20 adapted to rotationally secure the tool to the tool holder 12 such that the tool is not free to rotate within the tool holder. Slot 20 may be a square slot in order to accommodate a tool such as a tap, or may alternatively be omitted in favor of other suitable means for securing a different tool, such as a drill, to the tool holder. One such means for securing a drill to the holder would be a threaded screw which bears upon the shank of the tool in a well known manner. Other techniques of rotationally securing the tool to the tool holder will be appreciated by those skilled in the art.

The tool is held within the cavity 18 in the axial direction by means of the insert bushing 14 which is spring mounted within the cavity 18 by compression spring 22. The internal surface of the cavity 18 is provided with an inwardly directed flange 24 which provides a radial recess in the inside of cavity 18. Mounted within the insert bushing 14 are a plurality of bearings, two of which, 26a and 26b are shown. Preferably, three such bearings are provided within the insert bushing 14. The bearings 26a and 26b are held partially captive within the insert bushing 14 in the manner as illustrated in FIG. 1b, by ledge 28, and function to bear down upon the tool as the bearings are moved radially inward against the surface of the tool by virtue of the inclined portion of flange 24, as the insert bushing 14 is forced outwardly in the axial direction under the influence of compression spring 22. Thus, by pushing the insert bushing 14 radially inward to allow bearings 26a and 26b to move into the recesses provided by the flange 24, the appropriate tool may readily be inserted or removed a desired.

The tap adapter assembly 10 in accordance with the present invention is provided with a plurality of conduits which extend from the connector portion 16 to the rightmost surface of the tool holder 12 adjacent to the tool. More specifically, a centrally disposed conduit 30 within portion 16 diverts into a pair of intermediate conduits 32 and 34, each forming an approximately 30° angle with respect to the center line of the adapter assembly 10. Intersecting the intermediate conduits 32 and 34, respectively, are terminal conduits 36 and 38 which extend substantially parallel to the center line of the adapter assembly up to the end of the assembly adjacent the tool, except for the termination portions 40 and 42 of conduits 36 and 38, respectively. The terminal portions 40 and 42 are angled radially inward toward the center line in order to direct the flow of the coolant or lubricant directly onto the tool in a manner to be described in more detail below. The conduits 32–38 may be formed as bores extending all the way through the adapter assembly and plugged at the appropriate locations as illustrated. Although two conduit paths are illustrated in FIG. 1A, the number which may be provided is a matter of choice as will be appreciated by those skilled in the art.

In operation, the tool adapter assembly 10 is mounted within the tool driver at connector portion 16 which is adapted to be received by the driver and fixedly secured thereto. The insert bushing 14 may then be manually forced radially inward to allow bearings 26a and 26b to move into the recesses provided by flange 24. The appropriate tool may then be inserted into cavity 18 (and slot 20 if a suitable fitting is provided on the tool), upon which time the insert bushing 14 may be released. The tool will then be fixedly secured to the adapter assembly 10 under the force of bearings 26a and 26b upon the shank of the tool. As the tool driver and associated apparatus is positioned to commence the machining operation, a pressurized flow of coolant or lubricant is provided from central conduit 30, through intermediate conduits 32 and 34 and through terminal conduits 36 and 38, upon which time the pressurized flow is expelled from the tap adapter assembly at terminal portions 40 and 42 of the conduits. By virtue of the inwardly directed terminal portions 40 and 42, the pressurized flow of fluid will be directed onto the tool, thereby flooding the tool with the coolant or lubricant.

The tool adapter assembly in accordance with the present invention thus provides the application of the desired coolant or lubricant directly onto the tool during the machining operation, using a standard tool driver and a standard tool. No other special apparatus other than the tool adapter assembly is required.

The tool adapter assembly in accordance with the present invention will be described as being used with the extended tap driver in accordance with a second aspect of the present invention, the tool adapter assembly in accordance with the first aspect of the invention finding particular utility therewith. In the following discussion, the adapter assembly 10 will be referred to as a "tap adapter assembly" and a tap will be illustrated as being disposed therein. However, it will be understood that the tool adapter assembly in accordance with the first aspect of the invention is not limited to use with a tap, other tools, such as drills and the like being equally applicable to the tool adapter assembly.

The extended tap driver will now be discussed with reference to FIG. 2. The extended tap driver 44 includes first and second portions, namely a mounting arbor 46 and the adjustable, center coolant fed, ball driven tension-compression tap driver unit 48.

The mounting arbor 46 is provided with a tapered shank portion 50, flange 52 and arbor shaft 54. The tapered shank 50 is adapted to be applied to a matching machine spindle, and the shaft 54 is rotated by a turning force applied to flange 52. Tapered shank 50 is provided with a fitting 56 to which is applied the source of the pressurized coolant or lubricant. Shank 50 and shaft 54 are provided with a central bore 58 through which the coolant or lubricant flows. The arbor 46 is internally configured so as to fit over the end portion of unit 48 as shown, and is secured thereto by means of a pair of screws (not shown) inserted into a pair a threaded bores 60 disposed at a 5° angle with respect to the vertical to assure non-slip contact with unit 48. Unit 48 is rotationally secured to mounting arbor 46 by means of a drive key 62 in a well known manner. Thus, the rotational energy delivered from mounting arbor 46 to unit 48 is transferred through the drive key 62.

Unit 48 includes tap driver housing 64 (secured to mounting arbor 46 as described above) and the adapter retainer 66 which is rotatably engaged by housing 64 and which is adapted to secure the tap adapter assembly 68. The adapter retainer 66 is generally cylindrical and is concentrically mounted within housing 64 as shown. The adapter retainer 66 is movable in the axial direction relative to housing 64 but is fixed with respect to housing 64 in rotational movement by virtue of drive ball 70 which is disposed within trough 72 of substantially the same diameter of that of drive ball 70. The trough 72 is disposed horizontally in the axial direction to allow movement of adapter retainer 66 relative to the housing 64, but any rotation of housing 64 will be imparted to retainer 66. Access to the drive ball 70 and trough 72 is available through the removable, or slidable drive ball cover 74.

The tap adapter assembly 68 is fixedly secured to the adapter retainer 66 by means of a quick release mechanism now to be described. The connector portion 16 (see FIG. 1A) of the assembly 68 is provided with an external, circumferential recess 74 into which a lock ball 76, partially captive within retainer 66, is adapted to be disposed. A cylindrical lock release bushing 78 is provided about adapter retainer 66 and is axially biased toward the tap adapter assembly 68 by means of compression spring 80. By manually moving the lock release bushing 78 away from the tap adapter assembly 68, to thereby place lock ball 76 in communication with an internal recess 82 provided in the bushing 78, the lock ball 76 can vertically rise a distance sufficient to allow removal from and insertion into retainer 66 of the tap adapter assembly 68. Upon release of the bushing 78, the lock ball 76 will be radially forced into recess 74, thus securing assembly 68 within retainer 66. The tap adapter assembly 68 is also rotationally fixed with respect to adapter retainer 66 by means of complementary driver key fittings 84, shown in dashed lines. Finally, the connector portion 16 of the tap adapter assembly 68 is further secured within the retainer 66 by means of plunger assembly 86 which is biased into abutment with the connector portions 16 by means of outwardly biased compression spring 88 disposed between the adapter retainer 66 and the plunger 86.

The axial force provided at the mounting arbor 46 which is transferred to the tap (which force tends to force the tap into or out of the material to be machined) is transferred from housing 64 to the adapter retainer 66 by means of compression springs 90 and 92 which bear upon a spring retainer 94 in abutment with adapter retainer 66. More specifically, compression spring 90 acts to bias housing 64 axially away from spring retainer 94, which in turn abuts adapter retainer 66 at abutment 96. On the other hand, compression spring 92, which is connected to adapter retainer 66 by means of retaining ring 98, outwardly biases adapter retainer 66 away from spring retainer 94, which in turn is also in abutment with compression/tension adjustment stud 100 at abutment 106 which is integral with stud 100. Adjustment stud 100 is threadedly secured to housing 64 at 102, and may be further secured to housing 64 by means of a screw provided through bore 104 in housing 64. Adjustment stud 100 is generally cylindrical, and includes a central bore through its center to provide the conduit 58 through the unit 48. Also provided is a screw driver fitting 108 at the end of the adjustment stud 100 closest to the tap adapter assembly 68, such that the axial position of the abutment means 106 can be adjusted by turning the adjustment stud 100. Compression spring 90 circumferentially surrounds adjustment stud 100 in close fitting relationship, as does spring retainer 94 and plunger 86, which is further provided with a spring loaded seal 110 which insures that no fluid escapes from conduit 58. Finally, spring 92 circumferentially surrounds spring 90 and a portion of spring retainer 94.

Operation of the adjustable center coolant fed ball driven tension compensation tap driver unit will now be described. The shank of the desired tap 112 is placed within cavity 18 (FIG. 1A) of the tap adapter assembly 68 by manually depressing the insert bushing 14 to allow the bearings to recede outwardly. Upon release of the bushing 14, the bearings are forced inwardly against the shank of the tap 112. The tap driver may then be placed in the appropriate position to commence the tapping operation. An axial force into the material to be machined is exerted on the tap driver, which force is directly transferred to housing 64. The axial force is transferred from housing 64 through compression spring 90 and spring retainer 94 to adapter retainer 66, which in turn directly transfers the axial force to the tap adapter assembly 68 and tap 112. The axial force can be increased but only under the control of the compression spring 90 which will continue to be compressed under increasing axial forces. The amount of force required to compress spring 90 will, in large part be determined by the amount by which the spring is already compressed by the position of abutment 106 of adjustment stud 100. Thus, by properly adjusting adjustment stud 100 by means of the screw driver fitting 108, prior to securing the tap adapter assembly 68 to the tool driver, the compressional forces may be adjusted. As the tap is driven into the material to be machined, a substantially constant compressional force may be applied thereto, under the control of compression spring 90.

At the appropriate time (such as immediately prior to, or concurrent with the tapping operation) the cooling or lubricating fluid may be pumped through the conduit 58 to the tap adapter assembly 68 to thereby flood the tool 112, as more fully described above.

After the bore has been fully tapped, the tap may be removed from the bore under an axial tension (pulling force) substantially equal to the axial compression force employed in the insertion process. The axial tension is provided by compression spring 92 in the following manner. The tension or "pulling" force provided from housing 64 and acting on tap 112 causes an axial "separation" between housing 64 and the adapter retainer 66. In the drawing of FIG. 2, this lefthand directed force acting on housing 64 is directly transmitted to the abutment portion 106 of the adjustment stud 100 since stud 100 is threadedly secured to housing 64. Portion 106 which is in abutment with spring retainer 94 causes a compression (in the left hand direction) of spring 92 which is disposed between the spring retainer 94 and the adapter retainer 66 by means of retaining ring 98. The tension force thus applied to the tap upon removing the tap from the bore is controlled by compression spring 92 in a manner analogous to that provided by compression spring 90 during the insertion operation. Again, the tension force applied to the tap may be adjusted by suitably adjusting stud 100.

Thus, through the use of the arrangements in the extended tap driver as described above, the compression and tension functions may be provided within a housing having significantly smaller outer dimensions than those heretofore available in the art. Additionally, the extended tap driver described above readily lends itself to use with the tool adapter assembly in accordance with the first aspect of the invention, by specifically providing the centrally disposed conduit 58 all the way through the tap driver.

Although the invention has been described with respect to specific embodiments of the apparatus, it is readily apparent that modifications, alterations, or changes may be made without departing from the spirit and scope of the invention as defined by the following claims.

What is claimed is:

1. An apparatus for driving a tap comprising:
   a generally cylindrical shaft adapted at one end to be secured to means for rotating said shaft, said shaft having a shaft bore disposed therethrough;
   generally cylindrical tap retaining means substantially concentrically mounted within and adjacent to the other end of said shaft so as to allow axial movement relative to said shaft, said tap retaining means adapted to secure said tap thereto;
   means for transferring rotational movement from said shaft to said tap retaining means;
   first abutment means attached to the interior of said tap retaining means and extending radially inward therefrom;
   a generally cylindrical center stud secured to said shaft and substantially concentrically disposed within said shaft and said tap retaining means, said stud having a stud bore disposed therethrough in communication with said shaft bore;
   second abutment means attached to the exterior of said center stud and extending radially outward therefrom;
   spring retaining means disposed on the side of the first and second abutment means which is closer to said one end of said shaft, said spring retaining means adapted to be in abutting relationship with said first and second abutment means;
   a first compression spring functionally disposed between said spring retaining means and said shaft; and
   a second compression spring functionally disposed between said spring retaining means and said tap retaining means,
   whereby a fluid may be delivered to tap means secured to said tap retaining means by way of said shaft bore and said stud bore.

2. The apparatus of claim 1 wherein said center stud is threadedly secured to said shaft, whereby the position of said second abutment means relative to said shaft may be adjusted by rotating said center stud relative to said shaft.

3. The apparatus of claim 2 wherein said first compression spring is in abutment with said spring retaining means and said shaft, and said second compression spring is in abutment with said spring retaining means and a retaining ring fixedly secured to said tap retaining means.

4. The apparatus of claim 3 whereby said spring retaining means is generally cylindrical, is concentrically disposed between said tap retaining means and said center stud, at least a portion of said spring retaining means being in abutment with said tap retaining means and said center stud.

5. The apparatus of claim 4 wherein said first compression spring is concentrically mounted in close-fitting relationship about said center stud, and said second compression spring is concentrically mounted between said first compression spring and said tap retaining means.

6. The apparatus of any one of claims 1–5 wherein said tap retaining means includes a fitting integral therewith for receiving a tap and a tap adapter which is selectively attachable to, and releasable from, said fitting, for securing the tap to said tap retaining means.

7. The apparatus of claim 6 wherein said tap adapter comprises at least one conduit therethrough whereby said fluid may be delivered to said tap by way of said shaft bore, said stud bore, and said at least one conduit.

* * * * *